(12) United States Patent
Schwarz et al.

(10) Patent No.: US 8,838,575 B2
(45) Date of Patent: Sep. 16, 2014

(54) GENERIC FRAMEWORK FOR HISTORICAL ANALYSIS OF BUSINESS OBJECTS

(75) Inventors: Matthias Schwarz, Mannheim (DE); Peter Haerle, Walldorf (DE)

(73) Assignee: SAP AG, Walldorf (DE)

( * ) Notice: Subject to any disclaimer, the term of this patent is extended or adjusted under 35 U.S.C. 154(b) by 525 days.

(21) Appl. No.: 13/197,597

(22) Filed: Aug. 3, 2011

(65) Prior Publication Data

US 2013/0036115 A1 Feb. 7, 2013

(51) Int. Cl.
G06F 17/30 (2006.01)
G06F 7/00 (2006.01)
G06Q 10/10 (2012.01)

(52) U.S. Cl.
CPC .......... *G06F 17/30309* (2013.01); *G06Q 10/10* (2013.01)
USPC .......................................... 707/711; 707/736

(58) Field of Classification Search
CPC ............... G06F 8/10; G06F 8/30; G06F 8/40; G06F 9/541; G06F 9/548; G06Q 10/10; G06Q 30/06; H04L 29/06; H04L 67/16; H04L 67/2819; H04L 67/2842; H04L 67/288; H04L 69/08
USPC ........................................................ 707/736
See application file for complete search history.

(56) References Cited

U.S. PATENT DOCUMENTS

| 7,089,237 | B2 * | 8/2006 | Turnbull et al. ......... 707/999.01 |
| 7,248,855 | B2 * | 7/2007 | Joyce et al. .................... 455/406 |
| 7,260,568 | B2 * | 8/2007 | Zhang et al. .................. 707/711 |
| 2002/0103789 | A1 * | 8/2002 | Turnbull et al. ................... 707/3 |
| 2003/0026404 | A1 * | 2/2003 | Joyce et al. .............. 379/144.01 |
| 2005/0027559 | A1 * | 2/2005 | Rajan et al. ........................ 705/1 |
| 2005/0234953 | A1 * | 10/2005 | Zhang et al. .................. 707/101 |
| 2007/0156476 | A1 | 7/2007 | Koegler et al. |
| 2007/0244917 | A1 * | 10/2007 | Jones et al. ................... 707/102 |
| 2009/0164497 | A1 * | 6/2009 | Steinmaier et al. ........... 707/102 |
| 2010/0070331 | A1 | 3/2010 | Koegler et al. |
| 2010/0070336 | A1 | 3/2010 | Koegler et al. |
| 2010/0153432 | A1 | 6/2010 | Pfeifer et al. |

FOREIGN PATENT DOCUMENTS

WO WO 2007/077024 7/2007

* cited by examiner

*Primary Examiner* — Pavan Mamillapalli
(74) *Attorney, Agent, or Firm* — Fish & Richardson P.C.

(57) ABSTRACT

The present disclosure describes methods, systems, and computer program products for analyzing historic changes to business objects. One method includes monitoring at least one business object for a modification made to at least one business object node attribute. In response to a monitored modification associated with a particular business object node attribute, a new historical version of the at least one business object node attribute is prepared, the new historical version of the at least one business object node attribute including the modified business object node attribute value. A previous historical version of the at least one business object node attribute is retrieved and updated in response to the monitored modification. The new historical version of the at least one business object node attribute and the updated previous historical version of the at least one business object node attribute are then stored.

17 Claims, 9 Drawing Sheets

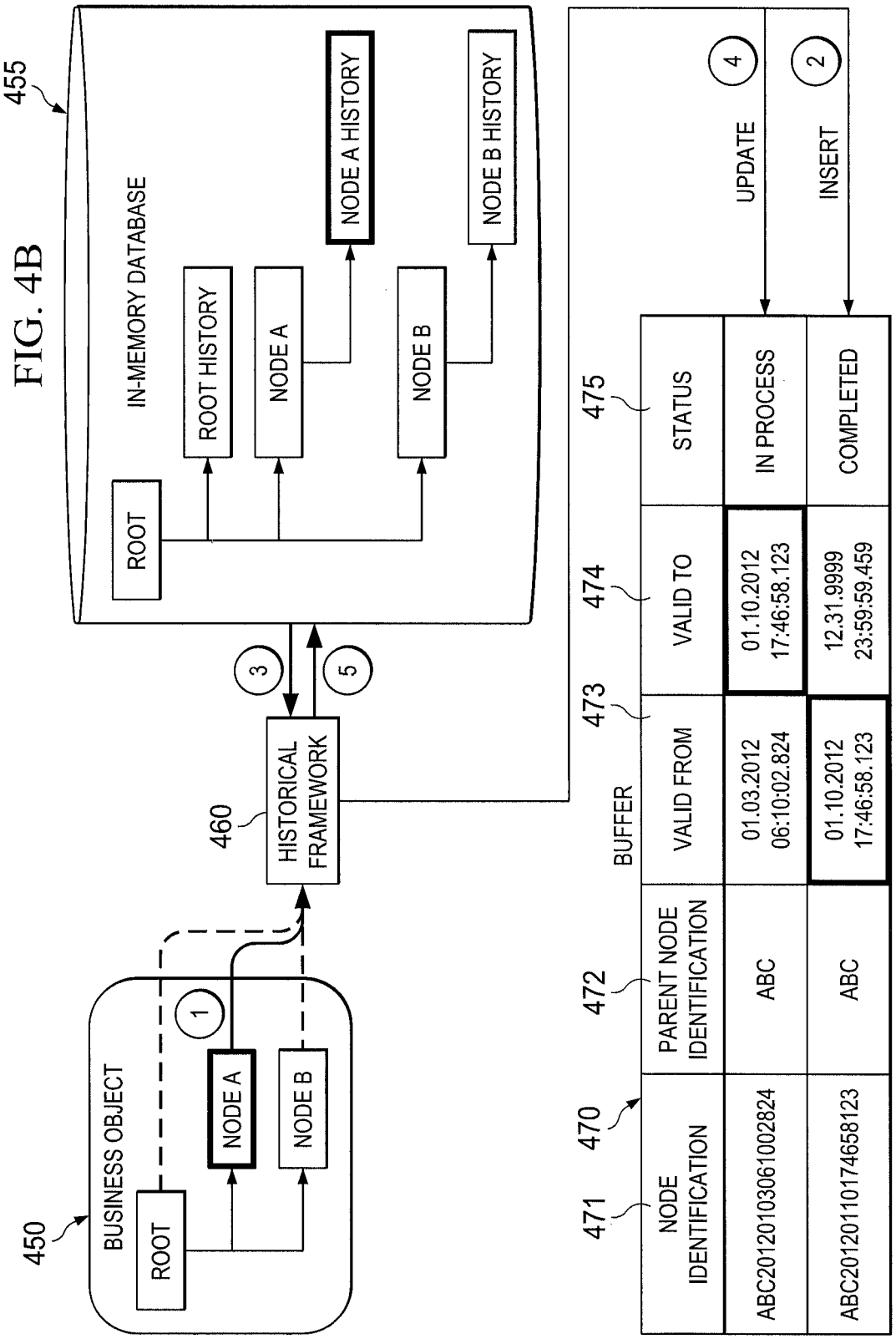

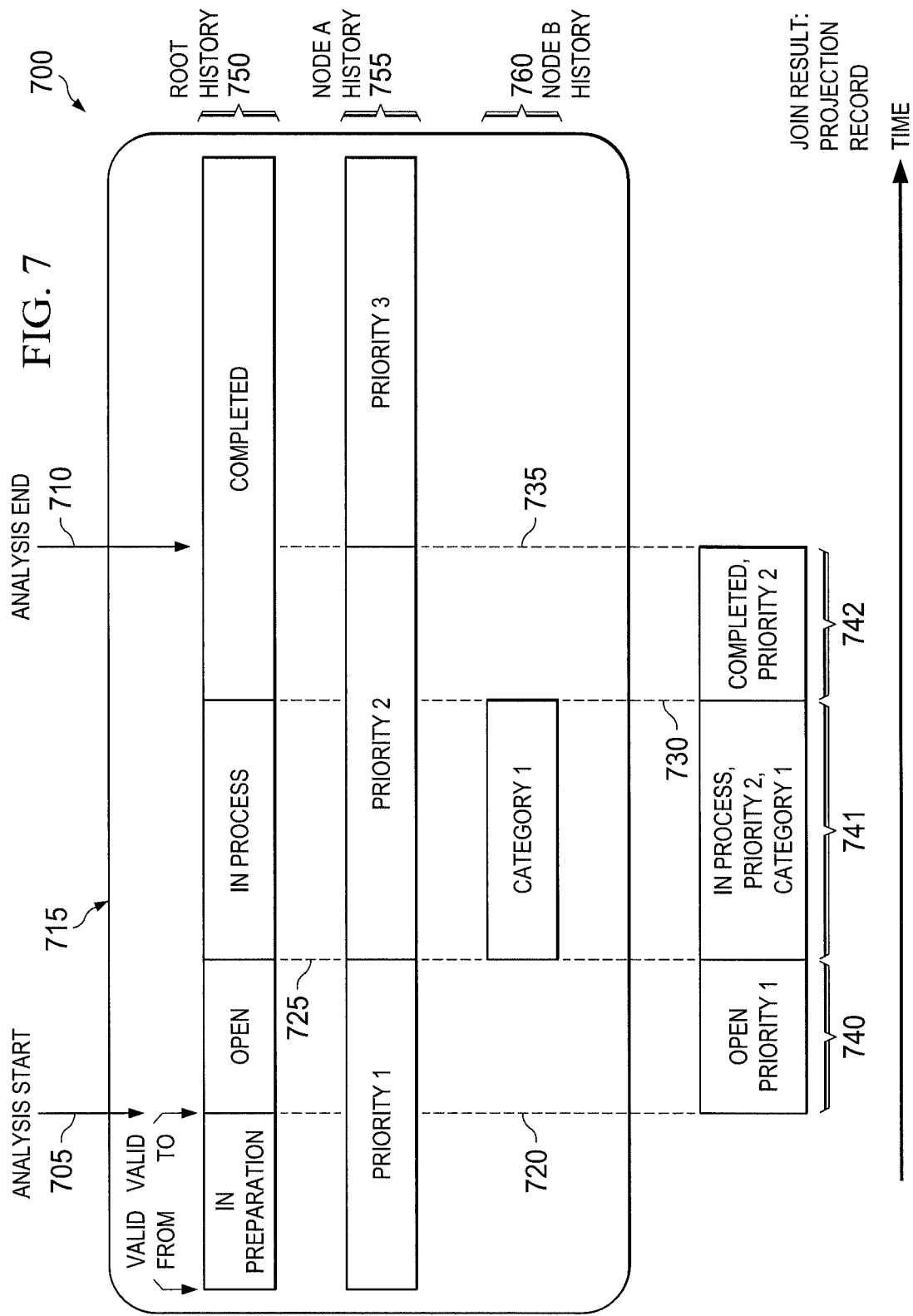

GENERIC FRAMEWORK FOR HISTORICAL ANALYSIS OF BUSINESS OBJECTS

TECHNICAL FIELD

The present disclosure relates to software, computer systems, and computer-implemented methods for analyzing historic changes to business objects.

BACKGROUND

A business object is a software code construct that corresponds directly to a thing in the actual business the software is meant to represent. The business object can encapsulate the business logic related to the thing, and can encapsulate the data that is required by the logic and also describes, defines, makes up, is contained by, and/or is associated with the thing. The business objects and their components may generally be recognizable to a non-technical entity, such as the software's users, business analysts, and the like. Each business object can include data that describes or is attributed to the object and methods that make decisions based on that data. Business objects can be associated with real-world items and concepts; however, some business objects are more conceptual in nature, but still have a real-world counterpart.

Business objects are constantly changing based on events in the overall business system and user or customer interactions. In current solutions, data for analyzing business object histories are created by daily copying of business object data from an operational data store (ODS) into a separate online analytical processing (OLAP) cube of a data warehouse. The historical versions of a given business object instance are distinguished by the date of a record that is copied into the relevant historical OLAP cube. Daily historical versions are created even where the business object data was not modified since the previous archiving action, leading to redundancy and increased data volume. Further, reconstruction of the historical data is not fully supported. If certain attributes of a business object are newly identified as historically relevant and should be archived, no opportunities exist to capture the previous instances and changes to those attributes prior to their designation as historically relevant.

SUMMARY

The present disclosure describes methods, systems, and computer program products for analyzing historic changes to business objects. One method includes monitoring at least one business object for a modification made to at least one business object node attribute. In response to a monitored modification associated with a particular business object node attribute, a new historical version of the at least one business object node attribute is prepared, the new historical version of the at least one business object node attribute including the modified business object node attribute value. A previous historical version of the at least one business object node attribute is retrieved and updated in response to the monitored modification. The new historical version of the at least one business object node attribute and the updated previous historical version of the at least one business object node attribute are then stored.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 4B is an illustrated version of the example process of FIG. 4A.

FIG. 7 is a diagram of an example set of historical business object data and an example projection record generated from an analysis of a particular analysis period.

DETAILED DESCRIPTION

This disclosure generally relates to software, computer systems, and computer-implemented methods for providing an analysis of historic changes made to one or more business objects. Specifically, tools and methods are used to provide historical information on historically relevant attributes of a business object, allowing for decreased amounts of unnecessary data to be stored within historical records. Further, historical information can be updated only when changes to the historically relevant business object attributes are made, thereby avoiding unnecessary replication operations to avoid redundant data and to minimize the volume of historical data. The time accuracy of the historical versions of the business object data can be improved from daily to sub-seconds, as information can be collected immediately upon detected or identified changes to historically relevant attributes. Additionally, reconstruction of historical versions of business objects are made possible based on the application of a particular analytical time period (or any time point), such that the state of the identified business object can be determined at a precise moment of time. The tools of the present disclosure also allow a creation of historical records for attributes that are newly identified as being historically relevant, even where the historical records of the attribute did not previously exist.

The present disclosure provides a generic framework that creates historical versions of business object instances that are stored on an in-memory database. Analytical reports can consume the data within the in-memory database to provide an arbitrary key time point (or time interval) for the analysis. As historical versions are created only for historically relevant business object attributes upon modification of those attributes, up-to-date and concise information can be stored and made accessible to analytical tools. As in-memory databases can be volatile structures, the present disclosure further provides processes and operations for reconstructing historical versions of business objects and their attributes, as well as the addition of historical information for one or more business object attributes that have not previously been identified as historically relevant attributes, and thus have not previously been included in the historical records.

Figure 1:
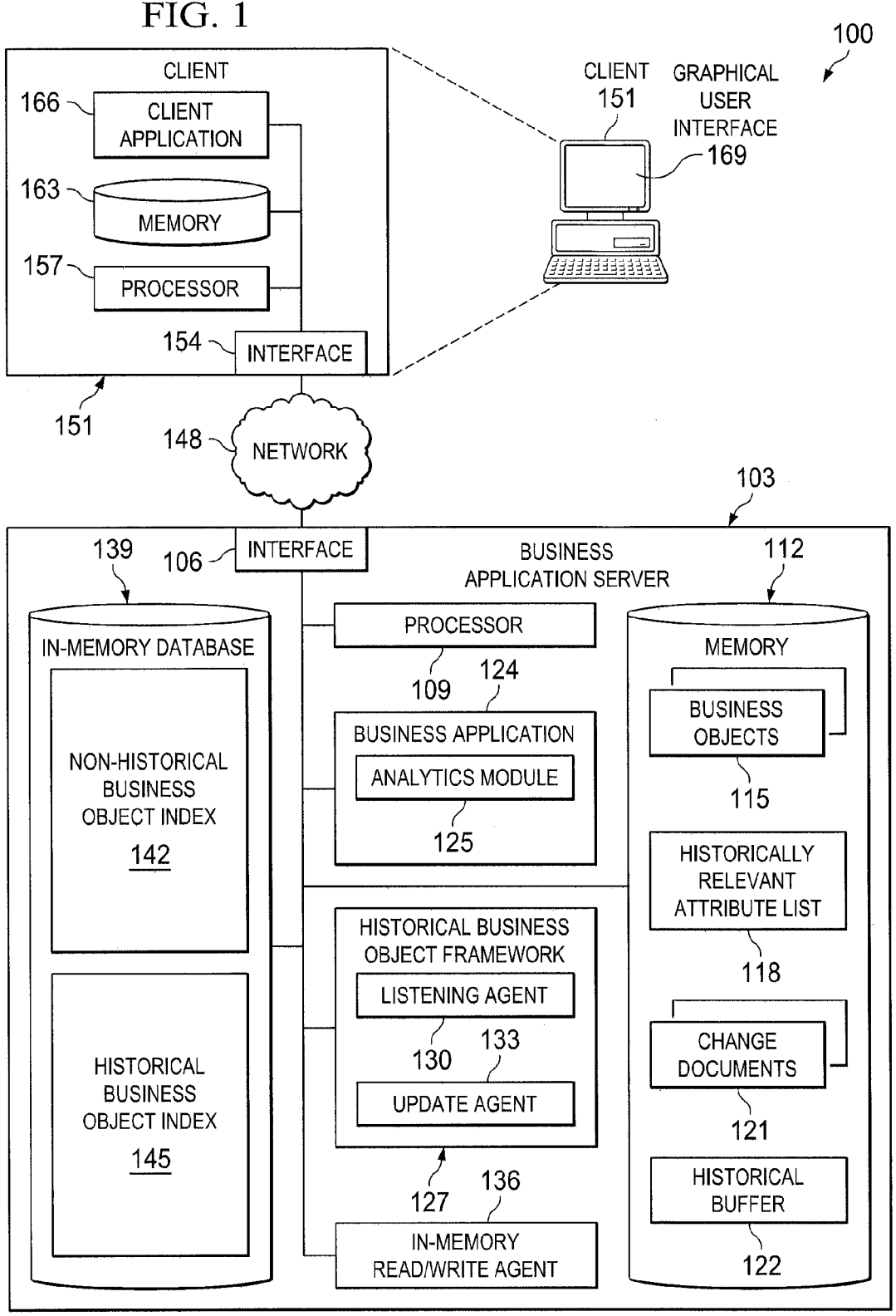
FIG. 1 illustrates an example environment for implementing various features of a system providing a generic framework for historical reporting on business objects.

FIG. 1 illustrates an example environment 100 for implementing various features of a system for providing a generic framework and associated methods for creating historical versions of business object instances and their associated attributes on an in-memory database. The illustrated environment 100 includes, or is communicably coupled with, a business application server 103 and at least one client 151. At least some of the communication between the business application server 103 and the clients 151 may be performed across or via network 148. In general, environment 100 depicts an example configuration of a system for creating sets of historical business object data and attributes within an in-memory database 139 that can allow for immediate access to historical data regarding the state of a business object at a particular time or over a particular time period. In some instances, the client 151 may also host its own in-memory database that can store similar data to that of the in-memory database 139. The client 151 may represent a business user or system submitting queries and requests for historical business object data to the business application server 103, where the business application server 103 can access the in-memory database 139 to access the stored historical data. The environment 100 is an example, and in alternative implementations, the elements illustrated in FIG. 1 may be included in or associated with different and/or additional servers, clients, networks, and locations other than those as shown. For example, one or more of the components illustrated within the business application server 103 may be located in multiple or different servers, cloud-based networks, or other locations accessible to the business application server 103 (e.g., either directly or indirectly via network 148).

In general, the business application server 103 is any server that stores and executes one or more business applications 124. For example, each business application server 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each business application server 103 may store a plurality of various other applications, while in other instances, each business application server 103 may be a dedicated server meant to store and execute a particular business application 124 and its related functionality. In some instances, the business application server 103 may comprise a web server or be communicably coupled with a web server, where one or more of the business applications 124 associated with the business application server 103 represent web-based (or web-accessible) applications accessed and executed through requests and interactions received on the client 151, executing a client application 166 operable to interact with the programmed tasks or operations of the corresponding business application 124.

At a high level, the business application server 103 comprises an electronic computing device operable to receive, transmit, process, store, or manage data and information associated with the environment 100. The business application server 103 illustrated in FIG. 1 can be responsible for receiving application requests from one or more clients 151 (as well as any other entity or system interacting with the business application server 103, including desktop or mobile client systems), responding to the received requests by processing said requests in the associated business application 124, and sending the appropriate responses from the business application 124 back to the requesting client 151 or other requesting system. The business application 124 can also process and respond to local requests from a user locally accessing the business application server 103. Accordingly, in addition to requests from the clients 151 illustrated in FIG. 1, requests associated with a particular business application 124 may also be sent from internal users, external or third-party customers, and other associated business applications or business processes, as well as any other appropriate entities, individuals, systems, or computers. In some instances, the business application 124 may be a web-based application executing functionality associated with a networked or cloud-based business process.

As used in the present disclosure, the term "computer" is intended to encompass any suitable processing device. For example, although FIG. 1 illustrates a single business application server 103, environment 100 can be implemented using any number of servers, as well as computers other than servers, including a server pool. Indeed, the business application server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated business application server 103 may be adapted to execute any operating system, including Linux, UNIX, Windows, Mac OS, or any other suitable operating system.

In the illustrated implementation of FIG. 1, the business application server 103 includes an interface 106, a processor 109, a memory 112, a business application 124, a historical business object framework 127, and an in-memory read/write agent 136. In some instances, the business application server 103 and its illustrated components may be separated into multiple components executing at different servers and/or systems. Thus, while illustrated as a single component in the example environment 100 of FIG. 1, alternative implementations may illustrate the business application server 103 as comprising multiple parts or portions accordingly.

FIG. 1 depicts a server-client environment, but could also represent a cloud computing network. Various other implementations of the illustrated environment 100 can be provided to allow for increased flexibility in the underlying system, including multiple business application servers 103 performing or executing one or more additional or alternative instances of the business application 124, as well as other applications associated with or related to the business application 124, including those illustrated as included as part of the business application 124. In those instances, the different business application servers 103 may communicate with each other via a cloud-based network or through the connections provided by network 148.

The interface 106 is used by the business application server 103 to communicate with other systems in a client-server or other distributed environment (including within environment 100) connected to the network 148 (e.g., one of the clients 151, as well as other systems communicably coupled to the network 148). The interface 106 generally comprises logic encoded in software and/or hardware in a suitable combination and operable to communicate with the network 148.

More specifically, the interface 106 may comprise software supporting one or more communication protocols associated with communications such that the network 148 or the interface's hardware is operable to communicate physical signals within and outside of the illustrated environment 100.

Generally, the business application server 103 may be communicably coupled with a network 148 that facilitates wireless or wireline communications between the components of the environment 100 (i.e., between the business application server 103 and one or more clients 151), as well as with any other local or remote computer, such as additional clients, servers, or other devices communicably coupled to network 148, including those not illustrated in FIG. 1. In the illustrated environment, the network 148 is depicted as a single network, but may be comprised of more than one network without departing from the scope of this disclosure, so long as at least a portion of the network 148 may facilitate communications between senders and recipients. In some instances, one or more of the components associated with the business application server 103 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can comprise either a wireline or wireless link. Example wireless links may include 802.11a/b/g/n, 802.20, WiMax, and/or any other appropriate wireless link. In other words, the network 148 encompasses any internal or external network, networks, sub-network, or combination thereof operable to facilitate communications between various computing components inside and outside the illustrated environment 100. The network 148 may communicate, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the business application server 103 includes a processor 109. Although illustrated as a single processor 109 in the business application server 103, two or more processors may be used in the business application server 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the business application server 103 and, specifically, the functionality associated with the corresponding business application 124, the historical business object framework 127, and the in-memory read/write agent 136. In one implementation, the server's processor 109 executes the functionality required to receive and respond to requests and instructions from the client 151, as well as the functionality required to perform the operations of the associated business application 124, historical business object framework 127, and the in-memory read/write agent 136, among others.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding business application 124 stored on the associated business application server 103. In some instances, a particular business application server 103 may be associated with the execution of two or more business applications 124 (and other related components), as well as one or more distributed applications executing across two or more business application servers 103.

At a high level, each business application 124 is any application, program, module, process, or other software that may execute, change, delete, generate, or otherwise manage information associated with a particular business application server 103, and in some cases, a business process performing and executing business process-related events. In particular, business processes communicate with other users, applications, systems, and components to send and receive events. In some instances, a particular business application 124 may operate in response to and in connection with one or more requests received from an associated client 151 or other remote client. Additionally, a particular business application 124 may operate in response to and in connection with one or more requests received from other business applications 124, including a business application associated with another business application server 103. In some instances, each business application 124 may represent a web-based application accessed and executed by remote clients 151 via the network 148 (e.g., through the Internet, or via one or more cloud-based services associated with the business application 124). Further, while illustrated as internal to the business application server 103, one or more processes associated with a particular business application 124 may be stored, referenced, or executed remotely. For example, a portion of a particular business application 124 may be a web service that is remotely called, while another portion of the business application 124 may be an interface object or agent bundled for processing at a remote system (not illustrated) or client 151 (e.g., the client application 166). Moreover, any or all of a particular business application 124 may be a child or sub-module of another software module or enterprise application (not illustrated) without departing from the scope of this disclosure. Still further, portions of the particular business application 124 may be executed or accessed by a user working directly at the business application server 103, as well as remotely at a corresponding client 151.

The business application 124 is illustrated as including an analytics module 125. In some instances, the analytics module 125 may be any component capable of identifying a set of criteria associated with a particular business object (e.g., from the set of business objects 115) or business object instance, and, in response, perform an analytical analysis of the identified business object(s) to generate a response, results, or report based on the analysis. In the present example, the analysis may include a historical view of a particular business object instance used to provide historical information of the previous modifications performed on or associated with the particular business instance over an identified analysis period. In some instances, the analysis period may be a single point in time such that the response provides a business object state at that point in time. Alternatively, the analysis period may have a start point and a different end point, where the results of the analysis show how the business object instance was changed during that analysis period. If the business object instance was not changed over the analysis period, the results may identify a single set of attributes for the historical analysis. If the business object instance was changed, several sets of business object instance attributes may be combined into a flat table or field to show the different attribute values and the times during which they were each valid.

The business processes performed by the business application 124 may include actions performed on or associated with one or more business objects 115 stored in memory 112. The memory 112 of the business application server 103 stores data and program instructions. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects or data, including classes, frameworks, applications, backup data, business objects, jobs, web pages, web page templates, database tables, process contexts, repositories storing services local to the business application server 103, and any other appropriate information including any parameters, variables, algorithms, instructions, rules, constraints, or references thereto associated with the purposes of the server 103 and its business application 124. In some implementations, including a cloud-based system, some or all of the memory 112 may be stored remote from the business application server 103, and communicably coupled to the business application server 103 for usage. As illustrated, memory 112 includes the set of business objects 115, a historically relevant attribute list 118, a set of change documents 121 associated with various business objects 115, and a historical buffer 122.

The business objects 115 may be stored in a particular repository (not shown) within or external to memory 112. Each business object 115 may be a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contains four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

In general, each business object 115 is structured into multiple nodes, where each node can be identified by a database table. The business object's nodes can be replicated into corresponding data spaces (or indices) within the in-memory database 139 for search and analytical reporting purposes, among others. Typically, only a subset of node attributes is changed frequently during the lifecycle of a particular business object instance. Out of that subset, one or more node attributes may be of particular import or interest to users or other systems. As illustrated in FIG. 1, the historically relevant attribute list 118 of memory 112 identifies which of those node attributes are considered important. The historically relevant attribute list 118 may comprise any suitable type of file that can be used to identify one or more historically relevant attributes of various business objects 115 that are considered historically relevant. A business object 115 considered historically relevant can be monitored (i.e., by listening agent 130) to determine when changes to the business object 115 are made, and further, when particular historically relevant business object node attributes are modified. Those attributes identified as historically relevant can then be written to a historical set of data, including historical business object index 145 illustrated within in-memory database 139. In some instances, the current version of a business object 115 (or portions thereof) can be stored in the in-memory database 139, with prior versions of the historically relevant attributes within the business object 115, along with a defined validity period for each historical attribute value, being stored in the historical BO index 145. The historically relevant attribute list 118 can be modified automatically through predefined definitions of business objects that define which attributes are historically relevant, as well as manually by user input and interaction. In some instances, a learning mechanism may modify the historically relevant attribute list 118 over time based on analytical determinations over time, as well as on requests received from users and other systems or programs. Further, while illustrated as its own component, the information included in the historically relevant attribute list 118 may instead be stored or embedded within the one or more business objects 115, as a flag, additional attribute, or an embedded listing of historically relevant attributes.

Memory 112 is further illustrated as including a set of change documents 121. The set of change documents 121 represents a set of recorded modifications to one or more business objects 115. The change documents 121 may be used for logging purposes, to trace or reconstruct changes to business objects 115, and for investigation and/or auditing purposes. The set of change documents 121 may be generated automatically based on internal processes associated with the business application server 103. The change documents 121 may be stored in any suitable format, including text files, and XML files, among others. Change documents 121 may also be represented as an object, where the object stores at least some of the changes and is accessible to applications or components associated with the business application server 103. In some instances, one or more of the change documents 121 can be accessed, for instance, by the historical business object framework 127 to construct (or reconstruct) a set of historical information for a particular business object or business object attribute. This may be useful, for instance, where a new attribute is identified as historically relevant, or where information associated with a historical BO index 145 is lost, deleted, or unavailable.

Memory 112 is also illustrated as including historical buffer 122. The historical buffer 122 may be a buffer within memory 112 that can store information to be written to the in-memory database 139. The historical buffer 122 can be accessed by in-memory read/write agent 136, with the information stored thereon being written to one of the indices (or other constructs/databases) within the in-memory database 139. In some instances, the historical buffer 122 may be a runtime object (i.e., an internal table in ABAP programming).

The business application server 103 is included within in-memory database 139. In alternative implementations, the in-memory database 139 may be located external to the business application server 103 and communicably coupled to the business application server 103 and/or client 151 through the network 148. The illustrated in-memory database 139 may include integrated processing, i.e., all business and/or analytic operations done in processing memory. Moreover, content from business content sources (described more fully below) may be replicated from one or more transactional systems (e.g., coupled to the network 148) to the in-memory database 139 immediately. Thus, the in-memory database 139, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 139 may expose business data and capabilities to improve an end-solution for end users (e.g., the clients 151). The in-memory database 139 may reside on top of a computational engine (e.g., in the business application server 103 or otherwise) that facilitates fast manipulations on large amounts of business data and/or replication of entire business suite information. Thus, in some embodiments, the in-memory database 139 may provide for the following design principles/concepts: business data in real-time (e.g., GUI patterns for constantly updated business data); well-modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The illustrated in-memory database 139 stores one or more data objects that may include and/or reference a variety of objects that store and/or include business data. The in-memory database 139 may comprise a secondary persistency for historical information in addition to the primary persistency of the original business object data stored in memory 112. In some instances, the data objects may include data cubes, such as OLAP (online analytical processing) cubes. The data cubes may consist of a data structure that allows analysis of data, in some cases, faster than data stored in relational databases. The data cube may also allow manipulation and/or analysis of the data stored in the cube from multiple perspectives, e.g., by dimensions, measures, and/or elements of the cube. A cube dimension defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube may have three dimensions, but any number of dimensions may be designed into the cube (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, measures may include any appropriate business data that may be manipulated according to business logic to assist or support the business enterprise.

One or more functions may be performed on a data cube. For instance, the data cube may be pivoted, in various ways. Each pivot provides the business user with a distinct view of particular business data stored in the cube. For instance, in one view, a business user may be presented with sales data of a specific data within a particular geographic region across a particular time period with a particular focus on the sales vs. geography relationship. In another view, the same data (e.g., the same measures and elements) may be presented with a different focus, e.g., the sales vs. time period relationship. In some aspects, pivoting a data cube in real-time may allow the business user to more efficiently analyze the business data.

Other functions performable on data cubes may be, for instance, slice, dice, drill down/up, and roll-up. A slice operation identifies a subset of a multi-dimensional array corresponding to a single value for one or more members of the cube dimensions not in the subset. A dice operation is a slice operation on more than two dimensions of a data cube (or more than two consecutive slices). A drill down/up operation allows the business user to navigate the data cube's levels of data to reveal levels containing the most summarized (up) data to the most detailed (down) data. A roll-up operation involves computing all of the data relationships for one or more dimensions of the data cube.

As specifically illustrated in FIG. 1, the in-memory database 139 includes a non-historical business object index 142 and a historical business object index 145. These two indices may comprise several indices representing corresponding business object nodes, as opposed to two complete indices. The indexes may be data cubes storing real-time business data defining one or more current statuses of various business objects 115 (i.e., the non-historical business object index 142), as well as historical information defining previous states of historically relevant attributes of particular business objects 115 (i.e., the historical business object index 145). The historically relevant attributes included in the historical index 145 may be determined or defined by reference to the historically relevant attribute list 118. In some instances, the historical and non-historical indices can be illustrated as a single structure, as illustrated in FIG. 2, although multiple structures may also be used.

Figure 2:
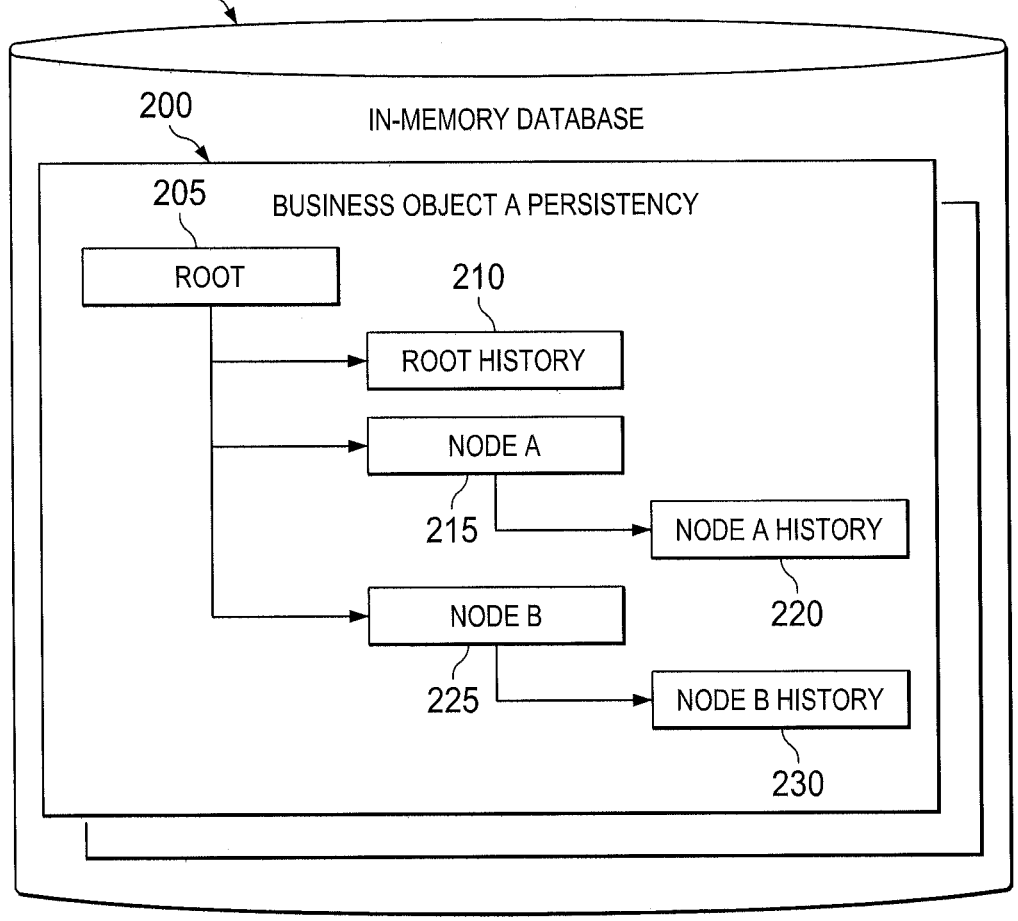
FIG. 2 is an illustration of an example set of historical and non-historical business object persistency data stored within an in-memory database.

The in-memory database 139 of FIG. 2 illustrates a hierarchical organization of a particular business object persistency 200. The persistency of the historical business object nodes are embedded into this structure. The organization corresponds to the hierarchical structure of the original business object model, and the illustrated business object A persistency 200 represents the persistency of the business object including the historical versions within the in-memory database 139. The business object persistency 200 includes a root node 205, a first node (node A 215), and a second node (node B 225). In a business object index which does not provide historical reporting capabilities, these three nodes may be the only nodes represented. In the business object index illustrated in FIG. 2, each node, including root node 205, has a sub-node that includes a historical set of data. Specifically, the root node 205 has sub-node root history 210, while node A 215 has sub-node node A history 220, and node B 225 has sub-node node B history 230. Unlike the underlying business object model, the business object persistency 200 illustrated in FIG. 2 is enriched with the historical information in the illustrated historical nodes, root history node 210, node A history 220, and node B history 230. The historical nodes include historical information for a subset of the business object nodes, This structure may be an analytics enablement object. The analytics enablement object may not have a primary database associated with it. Instead, the data received or replicated from the business object is stored on the in-memory database, with each node of the analytical enablement object represented by an index (either historical or non-historical). In general, the analytics enablement object can represent an extension to the traditional business object, and can allow transformation of original business object node attributes for analytical purposes.

In some instances, the individual nodes may contain a flat set of attributes, without additional hierarchical structures. In a traditional business object (i.e., 115 of FIG. 1), each node may have additional hierarchical structures based on the defined structure from the business object model. For example, for the purposes of this description, every business object node that contains one or more historically relevant attributes, a separate historical index may be generated within the in-memory database 139. For example, the attribute "status" may belong to node A, while the attribute "net value" may belong to node B. In this example, one index may be generated for node A, while another index may be generated for node B. The historical versions of the attribute "status" are persisted on the index "node A history" 220 and the historical versions of the attribute "net value" are persisted on the index "node B history" 230. FIG. 2 illustrates a structure combining multiple indices into one hierarchical structure, with root history 210, node A history 220, and node B history 230 each representing a different index.

Returning to FIG. 1, the business application server 103 further includes, and processor 109 executes, the historical business object framework 127. The historical business object framework 127 may be any suitable application or module (or suite combining multiple applications or modules) which manages, creates, and interacts with the historical indices of the in-memory database 139, as well as the business objects 115 within memory 112. In some instances, the historical business object framework 127 may be a part of, or functionality included within, the business application 124. In others, and as illustrated in FIG. 1, the historical business object framework 127 can be a component separate from the business application 124. In general, the historical business object framework 127 can interact with the business application 124, the business objects 115, the historically relevant attribute list 118, the change documents 121, and the historical buffer 122 in order to monitor changes to a set of business objects 115, determine/identify which of the node attributes associated with a particular business object are historically relevant (i.e., using the historically relevant attribute list 118), and update the in-memory database 139 and its indices (in some instances, via an in-memory read/write agent 136) to reflect the current and historical status of the associated business objects, among other functions.

For example, the historical business object framework 127 includes, and may be called by, a listening agent 130. The listening agent 130 may be one or more process agents operable to monitor particular business objects 115, where the listening agent 130 can identify when one of the business objects 115 is modified, manually, by the operations of the business application 124 and its associated processes, or otherwise. The listening agent 130 can report the modification to the historical business object framework 127, where the framework 127 can then determine whether the modifications were associated with a historically relevant business object attribute. If not, there may be no need to update the historical business object index 145. In some instances, the non-historical business object index 142 is updated with the current status of the business object 115 by the update agent 133. In general, the historical business object framework 127 handles and executes the modifications of historically relevant business object attributes in order to build-up the historical versions within historical BO index 145. In some instances, changes to non-historically relevant attributes may not be recorded in the non-historical business object index 142 until a historically relevant attribute is modified. When the modifications are associated with a historically relevant business object attribute, the update agent 133 of the historical business object framework 127 can be used to update the in-memory database 139 and its non-historical 142 and historical business object 145 indices (using the in-memory read/write agent 136). If the historical versions of the historical indices 145 are to be reconstructed or initially created, the historical business object framework 127 can store the modifications to the particular business objects 115 in the historical buffer 122, where the historical buffer 122 stores the changes to be made to the in-memory database 139. In some instances, the list of modifications in the historical buffer 122 can include the time the changes occurred, allowing for information on the validity period of historical data to be known for future analytic purposes. Additionally, a different agent (not illustrated) may handle general changes to business object attributes that are not historically relevant in order to provide the data to the in-memory database 139. That agent may update the in-memory database 139 by a normal update mechanism (i.e., the data may be overwritten if an update occurs).

In the illustrated example, the historical business object framework 127 may not be able to communicate directly with the in-memory database 139. Thus, the identified changes are stored in the historical buffer 122, which is then read by the in-memory read/write agent 136. The in-memory read/write agent 136 may be any application, module, or agent that is capable of interacting with, including reading from and writing to, the in-memory database 139. The in-memory read/write agent 136 can check for updates to the historical buffer 122, retrieve the updated information in the buffer 122, and modify the in-memory database 139 accordingly. Modifying the in-memory database 139 may include updating the validity period of previous historical data in the historical business object index 145, including adding an ending validity date and time for the previous entry for an attribute. New entries into the historical index 145 can include a beginning validity date and time, and can leave the ending validity date and time empty, null, or with a suitable placeholder. Modifying the in-memory database 139 may further include adding fields to the indices, overwriting the current data associated with a particular business object 115 in the non-historical index 142, and adding new node histories when an attribute is newly identified as historically relevant. The in-memory read/write agent 136 can be a part of the historical business object framework 127 in some instances, although it is illustrated as separate from and external to the framework 127 in FIG. 1.

Returning to FIG. 1, the illustrated environment 100 includes one or more clients 151. The clients 151 may be associated with a particular business application server 103. Each client 151 may be any computing device operable to connect to or communicate with at least one of the business application servers 103 using a wireline or wireless connection, via the network 148, or another suitable communication means or channel. In some instances, the client 151 may be a part of or associated with a business process involving one or more of the business applications 124. In general, each client 151 includes a processor 157, an interface 154, a client application 166, a graphical user interface (GUI) 169, and a memory 163. In general, the client 151 comprises an electronic computer device operable to receive, transmit, process, and store any appropriate data associated with the environment 100 of FIG. 1. It will be understood that there may be any number of clients 151 associated with, or external to, environment 100. For example, while illustrated environment 100 includes a single client 151, alternative implementations of environment 100 may include multiple clients communicably coupled to the one or more of the systems illustrated. In some instances, one or more clients 151 may be associated with administrators of the environment, and may be capable of accessing and interacting with the settings and operations of the business application 124, the historical business object framework 127, and/or other components of the business application server 103. Additionally, there may also be one or more additional clients 151 external to the illustrated portion of environment 100 capable of interacting with the environment 100 via the network 148. Further, the terms "client" and "user" may be used interchangeably as appropriate without departing from the scope of this disclosure. Moreover, while each client 151 is described in terms of being used by a single user, this disclosure contemplates that many users may use one computer, or that one user may use multiple computers.

The GUI 169 associated with each client 151 may comprise a graphical user interface operable to, for example, allow the user of a client 151 to interface with at least a portion of the business application 124 and its associated operations and functionality, including that of the analytics module 125. Generally, the GUI 169 provides the particular user with an efficient and user-friendly presentation of business data provided by or communicated within the system. The GUI 169 may comprise a plurality of customizable frames or views having interactive fields, pull-down lists, and buttons operated by the user. For example, the GUI 169 may provide interactive elements that allow a user to interact with a particular business application 124 or the historical business object framework 127, as well as other components within and/or external to environment 100. The different portions of the business application server's functionality may be presented and accessible to the user through the GUI 169, such as through a client application 166 (e.g., a web browser). Generally, the GUI 169 may also provide general interactive elements that allow a user to access and utilize various services and functions of a particular business application 124. In some instances, the client application 166 may be used to access various portions of different business application servers 103 or business applications 124. In some instances, the client application 166 may be used to access (and the GUI 169 used to view) information retrieved from the in-memory database 139 via the historical business object framework 127 and the business application 124. Alternatively, the client application 166 may be used to access and manipulate analytical information via the analytics module 125 of the business application 124. In some instances, the client application 166 may be an agent or client-side version of the business application 124. The GUI 169 may present the information of the client application 166 for viewing and interaction. In general, the GUI 169 is often configurable, supports a combination of tables and graphs (bar, line, pie, status dials, etc.), and is able to build real-time portals, where tabs are delineated by key characteristics (e.g., site or micro-site). Therefore, the GUI 169 contemplates any suitable graphical user interface, such as a combination of a generic web browser, intelligent engine, and command line interface (CLI) that processes information in the platform and efficiently presents the results to the user visually.

As used in this disclosure, each client 151 is intended to encompass a personal computer, touch screen terminal, workstation, network computer, kiosk, wireless data port, smart phone, personal data assistant (PDA), one or more processors within these or other devices, or any other suitable processing device. For example, each client 151 may comprise a computer that includes an input device, such as a keypad, touch screen, mouse, or other device that can accept user information, and an output device that conveys information associated with the operation of one or more business application servers 103, those system's business applications 124, historical business object frameworks 127, in-memory databases 139, and/or the client 151 itself, including digital data, visual information, or the GUI. Both the input and output device may include fixed or removable storage media such as a magnetic storage media, CD-ROM, or other suitable media, to both receive input from and provide output to users of client 151 through the display, namely, the GUI 169. The client's 151 processor 157, interface 154, and memory 163 may be similar to or different from those described in connection with the other components illustrated in FIG. 1, although alternative implementations of one or more of these components may be used, as well as implementations where additional components may also be included.

Figure 3:
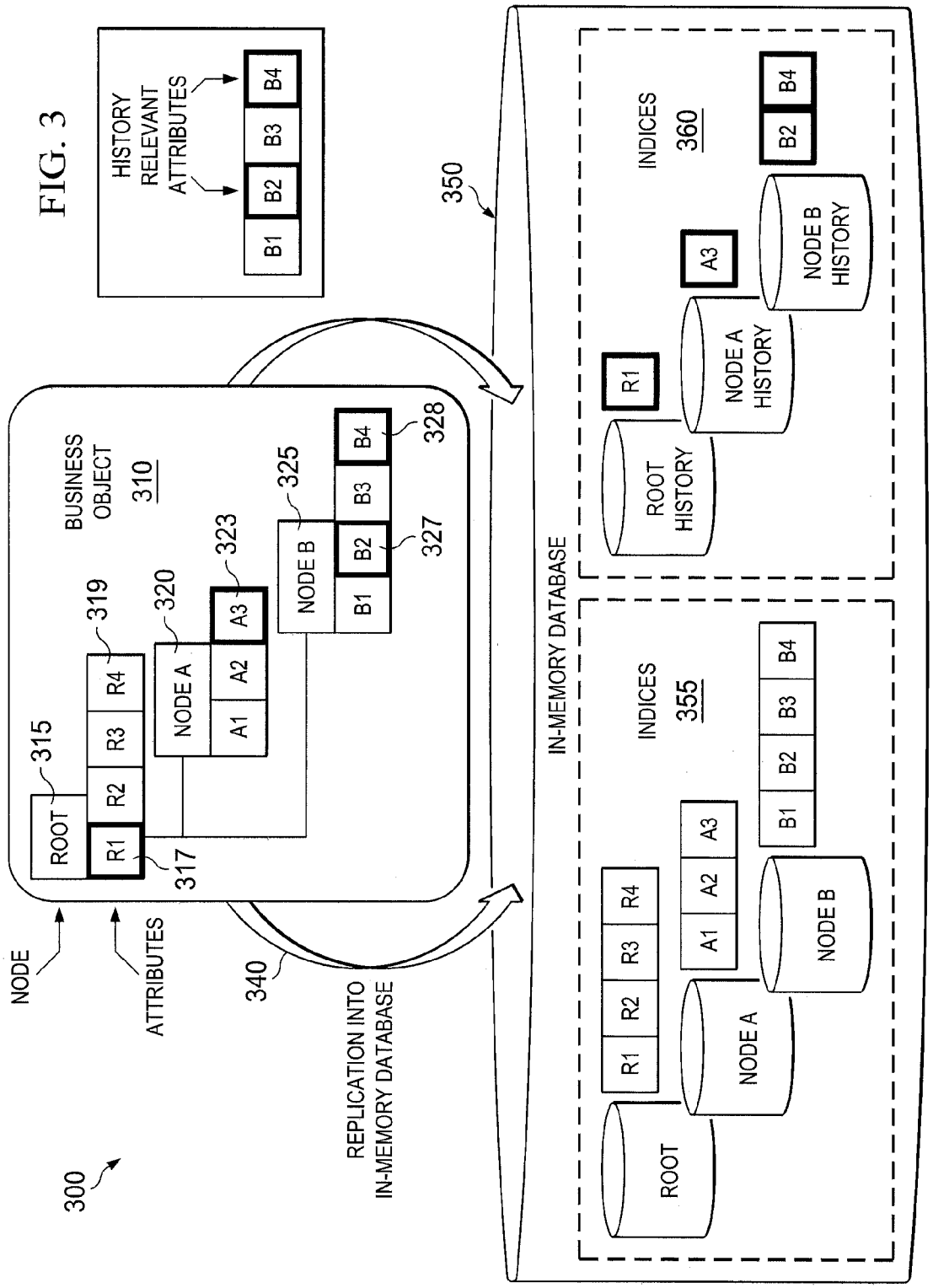
FIG. 3 is an example illustration of a business object from an example system being replicated to an in-memory database for providing analytical information on historical and non-historical business object data.

FIG. 3 is an example illustration 300 of a business object 310 from an example system being replicated to an in-memory database 350 for providing analytical information on historical and non-historical business object data. As illustrated, the business object 310 includes a root node 315 and two subordinate nodes, node A 320 and node B 325. Each of the illustrated nodes includes a plurality of attributes. As illustrated, the root node 315 includes attributes R1, R2, R3, and R4. Attribute R1 (317) is identified as a historically relevant node attribute. Further, attribute A3 (323) of node A 320 and attributes B2 (327) and B4 (328) are also historically relevant node attributes. As described above, the historically relevant identifier may be based on a historically relevant attribute list, on information included within the business object 310, or any other appropriate way. In the current example, A3 (323) of node A 320 may be associated with the attribute "status," while B2 (327) may be associated with the attribute "net value."

When one of the historically relevant node attributes is modified, the new values of the attribute are replicated (as illustrated by arrow 340) to the in-memory database 350. In the illustrated example, several indices are illustrated: a non-historical index 355 and a historical index 360. Although illustrated as two indices, each business object node may correspond to its own separate index. Reference to the non-historical index 355 or the historical index 360 can be understood as a reference to one or more of the various indices making up the corresponding index. In the non-historical index 355, the current set of attributes of the business object 310 are included. In the historical index 360, the values for the historically relevant attributes are stored, including prior values for the corresponding attributes. As illustrated, each node (root, A, and B) may have its own set of sub-indices, such that historical values for each node and its attributes are stored separately. The complete history of a particular business object instance can consist of the historical versions of one or more indices. Each historical attribute entry includes a validity period identifying when the corresponding historical values were valid. When an analysis period start and finish are defined, the appropriate values of the historical node attribute can be retrieved within those periods. In some instances, the full structure of a business object may be larger than that replicated to the non-historical index 355, with only a subset of the business object nodes and/or business object node attributes being stored in the in-memory database 350. Further, only a subset of that subset of business object nodes and/or business object node attributes may be considered or defined as historically relevant. While not apparent from the illustration of FIG. 3, the nodes illustrated in the in-memory database 350 may be stored in a hierarchical manner similar to that of FIG. 2.

A single historical version of a particular business object instance is assembled by a generic set of administrative attributes that can be found in each historical version (or set of historical attributes), and a specific set of historically relevant attributes containing the updated values. The administrative attributes can include the node ID, the node ID of the parent node (parent node ID), and the validity period. In order to make the node ID unique, it may be composed of the parent node ID and the starting point of the validity period for the particular historical value. In some instances, a hashed value of the parent node ID can be used to avoid length conflicts with the data type used to save additional database space.

Figure 4A:
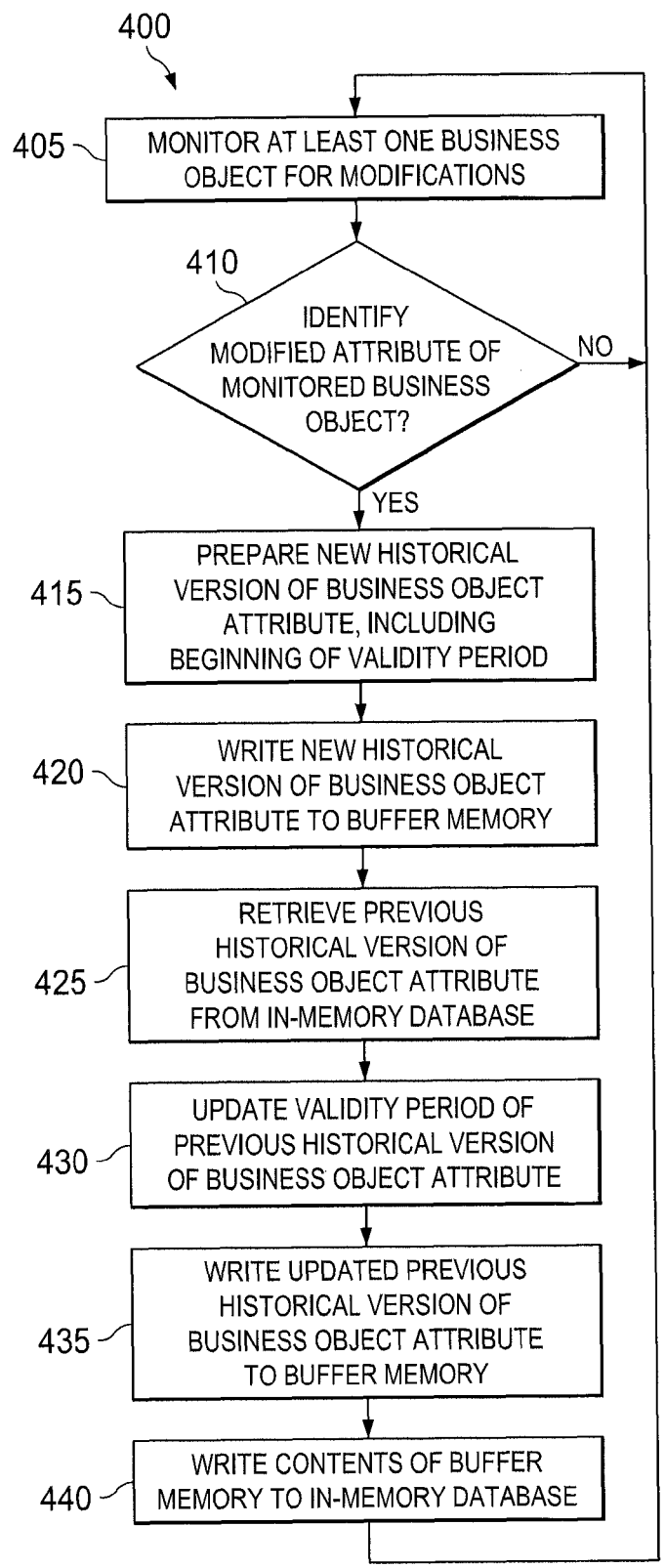
FIG. 4A is a flowchart of an example process for updating at least one in-memory database with historical business object data from identified changes within a business system.

FIG. 4A is a flowchart of an example process 400 for updating at least one in-memory database with historical and non-historical business object data from identified changes within a business system. For clarity of presentation, the description that follows generally describes method 400 in the context of environment 100 illustrated in FIG. 1. However, it will be understood that method 400 may be performed, for example, by any other suitable system, environment, or combination of systems and environments, as appropriate.

At 405, at least one business object ("BO") is monitored to identify modifications to historically relevant BO node attributes. Different BOs may have multiple attributes associated with various nodes. In method 400, however, only node attributes identified as historically relevant may trigger further operations. As such, a determination is made at 410 as to whether a historically relevant node attribute of a monitored BO is modified. If not, method 400 returns to 405 for further monitoring. If so, however, method 400 continues at 415. In some alternative implementations, modifications to non-historically relevant attributes may be updated in the in-memory database using alternative operations or processes. Those modifications may be overwritten during the operations of method 400.

At 415, a new historical version of the BO node attribute is prepared. The new historical version will include a date and time value identified when the modification occurred or was made. The new historical version of the BO node attribute can also include information identifying the particular node ID associated with the change, the parent node ID of the particular node, and the value associated with the modified BO node attribute. In some instances, the new historical version of the BO node attribute may include a placeholder value for the end of the validity period, such as "Dec. 31, 9999." In other instances, the new historical version of the BO node attribute may leave a field associated with the end of the validity period empty, or, instead, as a null value. At 420, the new historical version of the BO node attribute is written to a historical buffer, where the historical buffer is used prior to information being written to an in-memory database storing historical information for analytic purposes.

At 425, the immediately previous historical version of the BO node attribute is retrieved. In some instances, the information may be retrieved from the in-memory database storing a historical index or data space containing data defining historical versions of the BO node attribute. The previous historical version of the BO node attribute and its associated information may be written to the historical buffer. At 430, the validity period of the previous historical version of the BO node attribute can be modified to reflect the time when the newly identified modification occurred or was made. In some instances, the change may be made directly within the historical buffer if the previous version was already written there, while in others, the previous version of the BO node attribute may not be written to the historical buffer until the validity period modification of 430 is performed. In those cases, the updated previous historical version of the BO node attribute is written to the historical buffer at 435. Where the previous version is already written to the historical buffer, the validity period may be updated within the historical buffer at 435 instead.

At 440, the contents of the historical buffer can be written to the in-memory database to provide an updated historical record of the BO node attribute. In some instances, a non-historical record of the BO node attribute can also be updated to reflect the current status of the BO node attribute, as well, and can include additional updated information relating to other, non-historically relevant node attribute changes within the BO. By doing so, the historical and non-historical versions of the BO can be updated to provide the current information to users and applications that query the in-memory database for analytical purposes.

FIG. 4B is an illustrated version of the example process of FIG. 4A. In the illustrated example of FIG. 4B, the historical framework 460 (corresponding to an example implementation of historical business object framework 127 of FIG. 1) interacts with the business object (BO) 450, the historical buffer 470, and the in-memory database 455 to perform operations similar to those described in FIG. 4A. In the illustrated example, the historical framework 460 may be registered on a save event associated with the BO 450, such that when modifications occur to the BO 450, the historical framework 460 can act. If a particular BO node is changed, the historical framework 460 identifies the data of the changed node instance and verifies whether one or more historically relevant attributes are changed, as illustrated by (2). If so, a new historical version of the historically relevant BO node attribute is prepared.

As illustrated by (2), the new historical version of the BO node attribute is written to the historical buffer 470. As illustrated in FIG. 4B, the entry associated with the new historical version of the BO node attribute includes a node ID 471, a parent node ID 472, a valid from date/time value 473, a valid to date/time value 474, and a status value 475. The status value 475 represents the specific value of the BO node's "status" attribute. For the new historical version of the BO node attribute, the status value 475 is the updated value— here, "Completed." The valid from date/time value 473 and the valid to date/time value 474 define the validity period of the BO node attribute. As illustrated in the newly inserted BO node attribute, the valid to date/time value 474 is written as a placeholder date, such that analytical requests for a time after the last modification would provide the latest value. In some instances, the value to date/time value 474 for the newest historical version may be an empty or null value, as well as another predetermined placeholder. The parent node ID value 472 corresponds to the parent of the node attribute, identified in the present illustrated example as "ABC". The node ID 471 of the new historical version comprises the parent node ID of "abc" concatenated with a combination of the valid from date/time value 473 (i.e., the value of node ID 471 can be set to "ABC<valid from date/time>"). In this way, each new historical version can be provided a unique node ID. In some instances, the node ID of a historical version may instead contain a hashed node ID value of the parent node ID for a particular entry, as well as the valid from date/time. Alternative identifiers may also be used.

The historical framework 460 now updates the validity period end point (or valid to date/time value 474) for the previous historical version ($HV_{N-1}$) associated with the last change event or modification. The updated validity period end point of $HV_{N-1}$ corresponds to the new validity period start point (or valid from date/time value 473) of the new historical version ($HV_N$). As a note, a previous historical version will not exist when the BO node instance is initially created. To perform this update, the record associated with $HV_{N-1}$ is read from the in-memory database 455, as illustrated by (3). In some instances, the historical framework 460 may be able to read from and write to the in-memory database 455, while in other instances, the historical framework 460 may work through an agent, application, API, or other component to interact with the in-memory database 455. Once retrieved, the record $HV_{N-1}$ is updated with the new valid to date/time value 474, and is written to the historical buffer 470, as indicated by (4). Both records on the historical buffer 470 can then be posted or written to the appropriate index within the in-memory database 455, as illustrated by (5). If other BO nodes are also changed, the same procedure can be used to update their corresponding in-memory database indices.

Figure 5A:
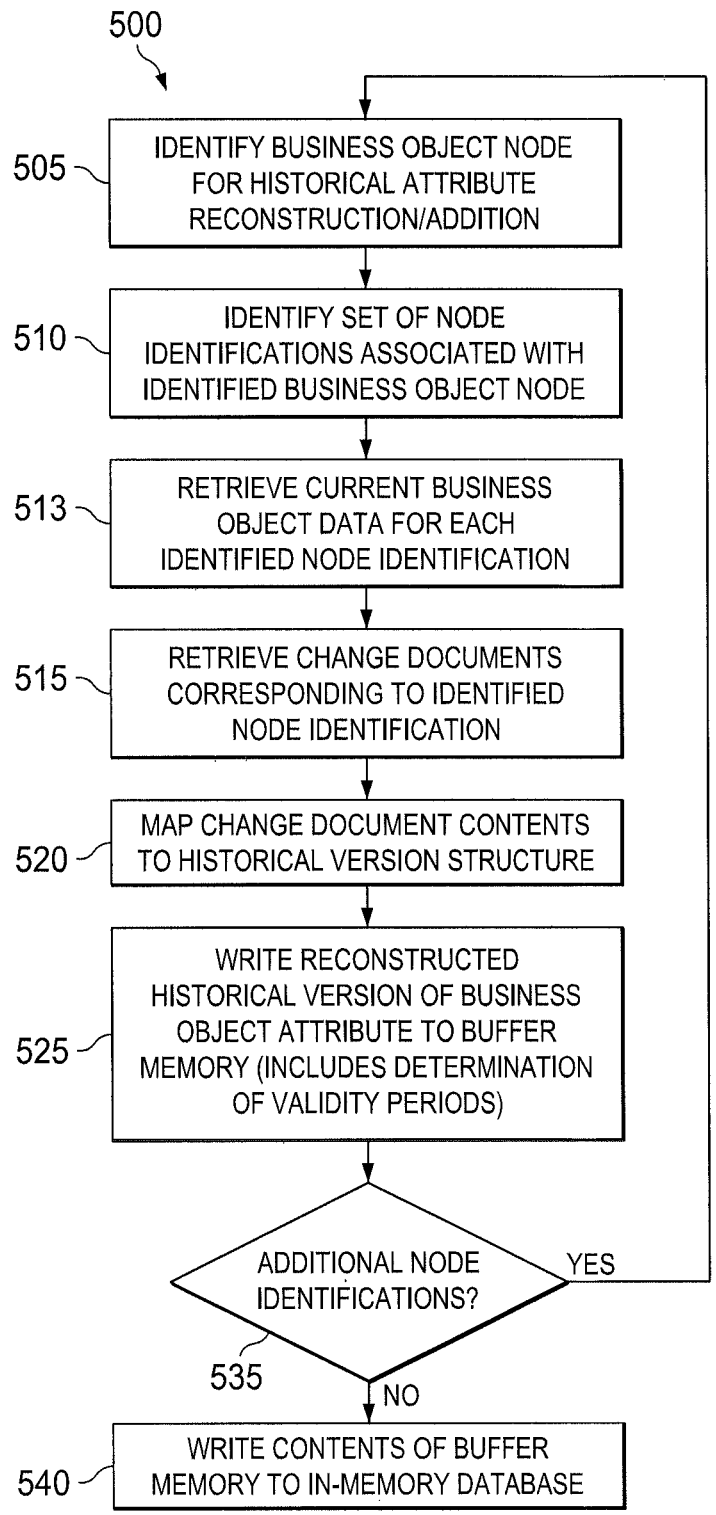
FIG. 5A is a flowchart of an example process for constructing or reconstructing a historical version of a business object node index in an in-memory database.

FIG. 5A is a flowchart of an example process 500 for constructing or reconstructing a historical version of a business object (BO) node index in an in-memory database. Constructing a historical version of a BO node index may be performed when a BO attribute is newly identified as historically relevant. Reconstructing the historical version may be performed where a prior version was erased, lost, or otherwise unavailable (e.g., where the memory resource storing the in-memory database is unavailable). Since the in-memory database and the historical versions of the BO are stored on a volatile in-memory database, a simple reloading of the previous historical versions into the in-memory database is not possible when the prior versions are lost or unavailable. The construction and reconstruction of BO node indices can use change documents that record modifications to different BO instances in order to reconstruct the historical versions of a particular BO node.

At 505, a particular BO node is identified for historical attribute reconstruction, or, alternatively, a particular attribute associated with the identified BO node is newly identified as historically relevant. At 510, a set of node IDs associated with the identified BO node is identified. A current set of BO data for an identified node ID is retrieved at 513. This retrieval provides the current status of the BO node and its attributes.

At 515, one or more change documents corresponding to the identified node ID are retrieved. The change documents contain documentation on the various modifications and changes to the BO and its nodes and node attributes over a period of time. In some instances, the change documents can be logging files, databases, or other suitable sets of information collecting modifications to particular BOs and their components, where the change documents contain a reference to the node ID of the particular BO node. In some instances, the contents of the change documents may not be in the exact format as used by the historical version of the BO node used in the in-memory database. For example, the change documents may be text-based files with logging information written for each change to a particular BO node. To use that data from the change document, the change document's contents are mapped to the structure of the historical version of the BO node at 520. The mapping may be known or predetermined, or the mapping may be dynamically performed based on evaluation of the identified change document. At 525, the historical data associated with the BO attribute based on the identified change documents is written to a historical buffer. The written data can include a node ID, a parent node ID, a validity period (including a valid from value and a valid to value), and the value of the associated BO node attribute.

At 535, a determination is made as to whether additional node IDs exist for the identified BO node. If additional node IDs remain (and were identified at 510), then method 500 returns to 515 and the change documents associated with the next node ID are retrieved. The process continues, with the updated information being written to the historical buffer to be added to the in-memory database. If, however, no additional node IDs were identified, method 500 continues at 540, where the contents of the historical buffer are written to the in-memory database to store the historical version of the BO node. In some instances, the update to the in-memory database can be performed in batches. For example, if 2000 node IDs associated with a root node, a package of 1000 node IDs may be processed in operations 515-540. That package of node IDs will then have their corresponding data written to the in-memory database, when the second 1000 node IDs will be processed and written to the in-memory database. The particular size of the package can be configured to be different values, or a default value may be used. Generally, FIG. 5A addresses the flow for a single package, and could be extended for determinations associated with a particular package size to be processed before data is written to the in-memory database.

Figure 5B:
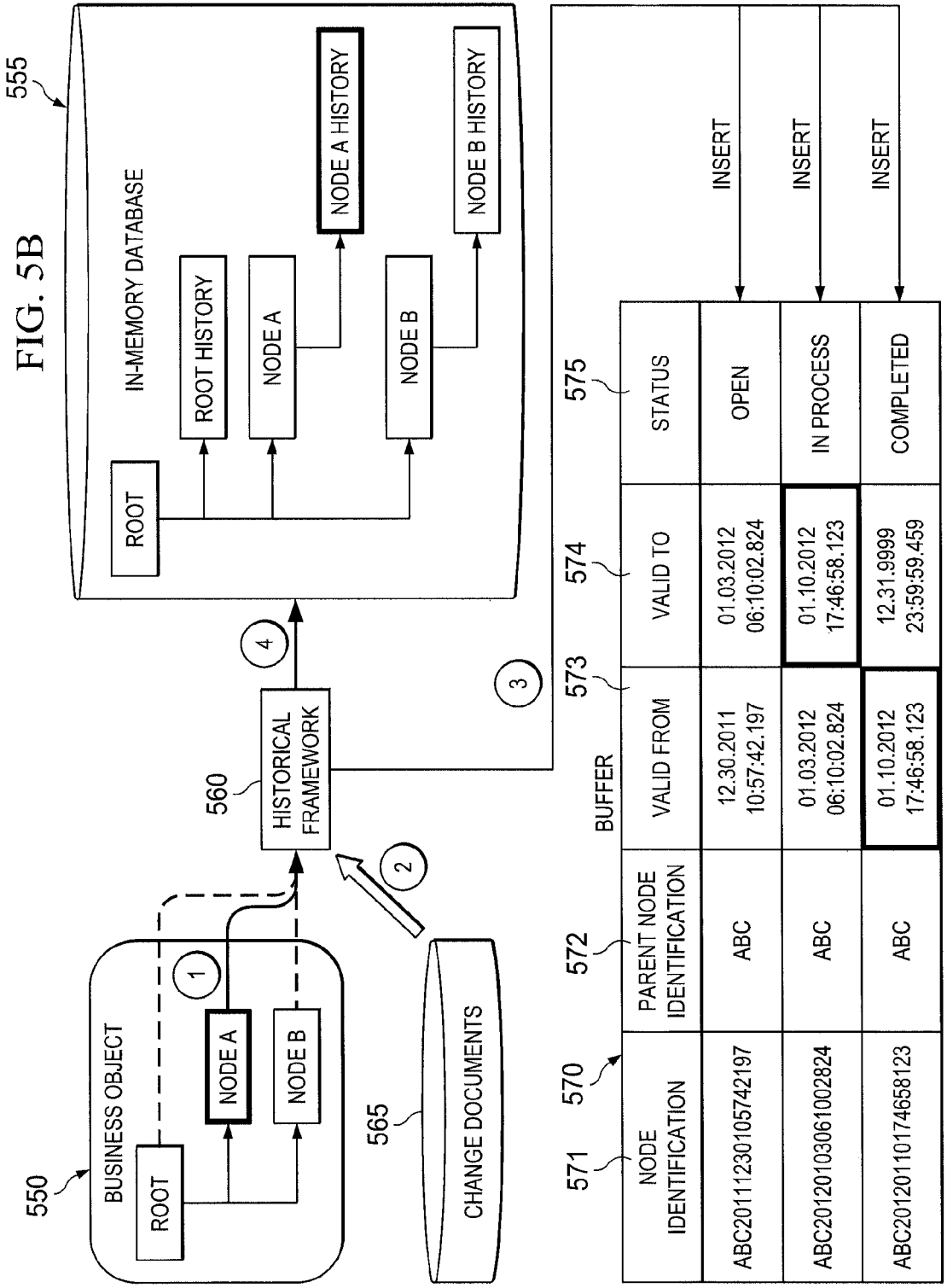
FIG. 5B is an illustrated diagram of the example process of FIG. 5A.

FIG. 5B is an illustrated diagram of example process 500 of FIG. 5A. In the illustrated example of FIG. 5B, the historical framework 560 (corresponding to an example implementation of historical business object framework 127 of FIG. 1) interacts with the business object (BO) 550, the historical buffer 570, the in-memory database 555, and a set of change document 565 to perform operations similar to those described in FIG. 5A. The illustrated example of FIG. 5A is associated with the reconstruction of a missing, lost, or unavailable historical version of an entire BO, as opposed to the addition of a newly identified BO that is newly considered historically relevant. Similar operations limited to a single BO node may be used in those situations, whereas an entire set of historical BO data is to be generated in the illustrated example.

In order to reload and/or reconstruct a complete set of historical versions of all BO node instances, all node IDs of the BO node are read from the BO 550 by the historical framework 560, as shown by (1). The historical framework 560 then accesses the set of change documents 565 to retrieve those changes documents 565 associated with the node IDs associated with the identified BO node, as shown by (2). The retrieved change documents 565 contain information to be used to recreate the historical versions of the BO instances. Since the change document data may be structured in a proprietary format, mapping the data into a format suitable for the historical versions may be necessary.

The historical versions of the BO instances are added to the historical buffer 570, as shown by (3). For every historical version $HV_N$, the validity period end time point (corresponding to the valid to value 574) of the previous historical version $HV_{N-1}$ is updated with the validity period start time point (valid from value 573) of $HV_N$ (if $HV_{N-1}$ exists). The historical versions of the BO node within the historical buffer 570 are then written to the in-memory database 555 by the historical framework 560. The process provides the in-memory database 555 with a historical version of the particular BO node (as shown here, for node A with node ID "ABC"). If multiple BO node attributes are historically relevant, a historical version for each attribute can be added to the in-memory database 555.

Figure 6:
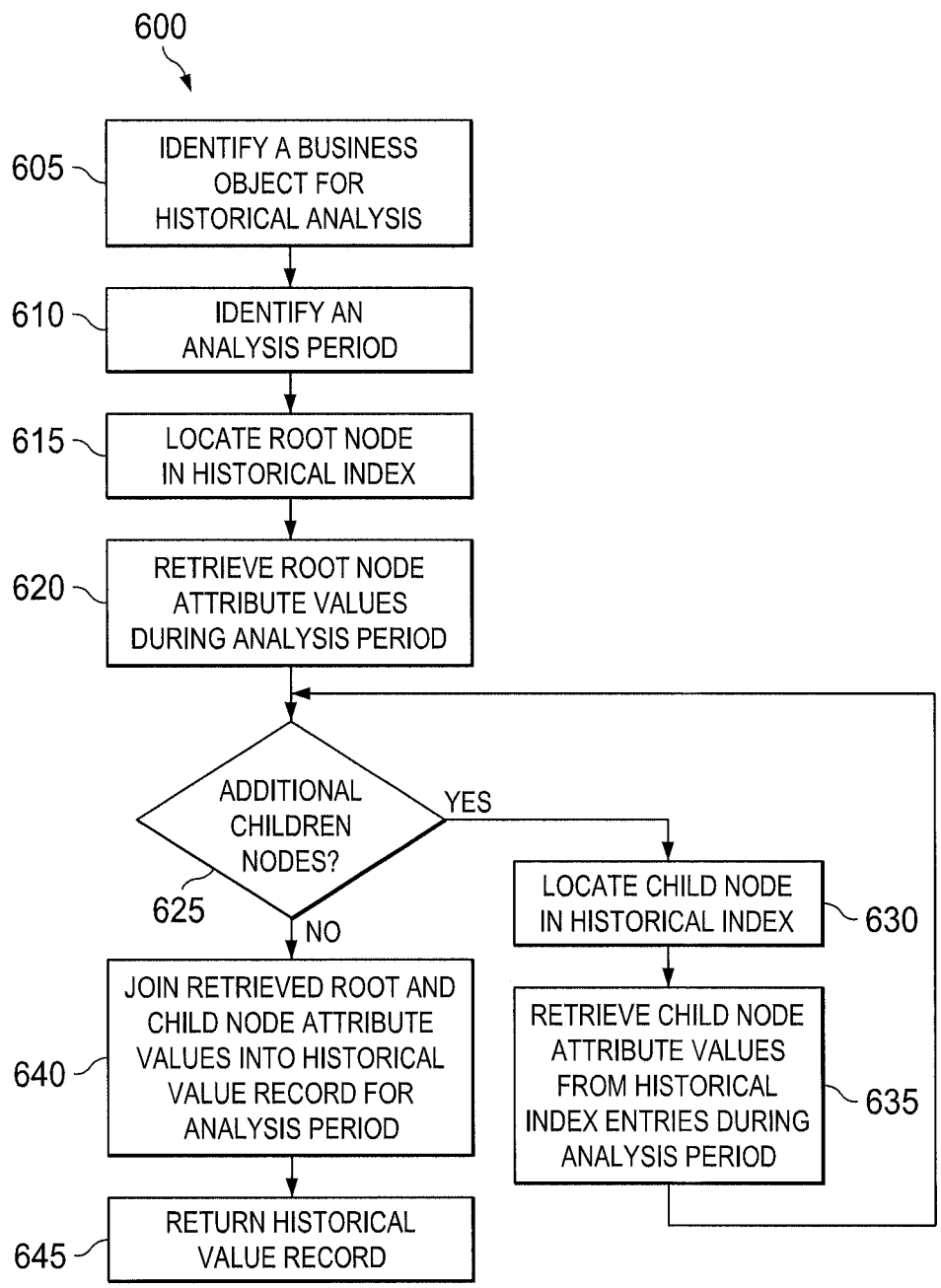
FIG. 6 is a flowchart of an example process for generating a historical version of a business object for analytical purposes based on an identified time period.

FIG. 6 is a flowchart of an example process 600 for generating a historical version of a business object (BO) for analytical purposes based on an identified time period. For the illustrated example, the historical data of a particular BO is stored in an in-memory database within one or more indices, each of the indices associated with a particular BO node.

At 605, a specific BO instance is identified for historical analysis purposes. As each BO may have many different BO instances, a single BO instance can be identified to provide targeted information about a particular instance. In other instances, information on a plurality of different BO instances may be desired. The operations of process 600 can be repeated for each of those desired BO instances to generate historical information on each. The BO instance may be specified by a business application capable of performing an analytical analysis of historical BO data. In some instances, a user associated with a remote client may define the criteria of a particular analysis, at the same time defining a particular BO instance upon which the analysis is to be based. At 610, an analysis period is identified. The analysis period can have a start point and an end point. In some instances, the analysis period can be a single instance, where the start point and end point are equivalent. An analysis with a single instance analysis period can provide information on the state of the BO at the single instance.

At 615, the root node of the identified BO instance is identified within the historical index of the in-memory database. The root node's node attribute values that are valid during the identified analysis period are retrieved at 620. The node attribute values valid during the analysis period are determined by comparing the validity periods of the nodes to the start and end point of the analysis period. If the valid to and valid from times do not intersect or fall within the analysis period, then those node attribute values are not considered within the analysis period.

At 625, a determination is made as to whether additional children nodes are present. If not, process 600 continues at 640. If, however, additional children nodes are present, process 600 moves to 630 where the first child node is located within the historical index. In some instances, information associated with some or all of the child nodes may be stored within their own historical index within the in-memory database. At 635, the child node attribute values that were valid within the identified analysis period are retrieved from the corresponding index. Process 600 returns to 625, where any additional children nodes under the root node are located and their values retrieved. In some instances, one or more of the child nodes may themselves be associated with sub-nodes containing additional historical information. Although not illustrated in FIG. 6, those sub-nodes can be also located and their information retrieved from the in-memory database, where appropriate.

At 640, the retrieved root and child node attributes valid during the analysis period are joined into a historical value record. At 645, the historical value record is returned or presented to the application or user requesting the analysis. In some instances, the historical value record can be a flat list of attributes from the set of nodes within the identified BO instance which match the analysis period.

FIG. 7 is a diagram 700 of an example set of historical business object data and an example projection record generated from an analysis of a particular analysis period. Specifically, FIG. 7 represents sets of information from which the historical version record (described in FIG. 6) is created. As illustrated, the historical version record pulls in information from three indices in the in-memory database 715, a root history index 750, a node A history index 755, and a node B history index 760. The values of the node attributes for each index are illustrated over a particular time frame. The diagram 700 shows the values of each BO node attribute over time. As shown, the BO attributes stored in the root history index 750 correspond to an initial value of "In Prep.," then a value of "Open," followed by a value of "In Process," and ending with a value of "Completed." The node A history index 755 begins with a value of "Priority 1," has a second value of "Priority 2," and ends with a value of "Priority 3." The node B history index 760 has a value of "Category 1" through a brief period of time, with no value during others.

An analysis period beginning with an analysis start value 705 and ending with an analysis end value 710 is defined. Each index (750, 755, and 760) is accessed and analyzed to identify the associated values of each node attribute during the analysis period. The relevant node attribute values for each index is illustrated over a period of time in FIG. 7.

The entries within each index are compared to the analysis period (i.e., between the analysis start value 705 and the analysis end value 710, respectively corresponding to the times associated with the dashed lines 720 and 735), and the projection records 740, 741, 742 are created as a result of joining the values identified from each index. In some instances, the analysis start value 705 and the analysis end value 710 may not correspond to the times associated with the dashed lines 720 and 735. Specifically, the analysis start value 705 and/or the analysis end value 735 do not have to correspond to a change in the values of one or more indices. At the time associated with the analysis start value 705, the value for the root node attribute was "Open," and the value for the node A attribute was "Priority 1." At the time associated with dashed line 725, the value for both the root node and node A changed, while a value for node B was added. Thus, the value of projection record 740 at that time is "In Process," "Priority 2," and "Category 1." At the time associated with 730, the value of the root history node attribute was changed, while the value of the node B attribute was removed. The value of the node A attribute, however, remained the same. Therefore, the projection record 741 reflects values of "Completed" and "Priority 2," from the time associated with dashed line 730 until the analysis end value 710. The projection record 742 can be represented as a flat file, a comma-separated value (CSV) file, a text file, or any other suitable file, document, or set of data.

The join condition for the projection records 740, 741, 742 can be defined as follows: Valid From≤Analysis End and Valid To>Analysis Start. Here "Analysis Start" and "Analysis End" are the start and end time point of an analysis period and "Valid From" and "Valid To" are the start and end time point of the validity period of a historical version. To provide a complete record, multiple historical versions can be combined to reflect a complete picture of a particular BO node attribute over time and after one or more modifications.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A non-transitory computer readable medium including program code for analyzing historic changes to business objects, the medium comprising computer readable instructions operable when executed by one or more processors to:

monitor at least one business object for a modification made to at least one business object node attribute, wherein a subset of business object node attributes of the at least one business object are defined as historically relevant;

prepare, in response to a monitored modification associated with particular historically relevant business object node attributes, a new historical version of the at least one historically relevant business object node attribute, the new historical version of the at least one historically relevant business object node attribute including the modified historically relevant business object node attribute value;

retrieve a previous historical version of the at least one historically relevant business object node attribute from a historical business object index, where the historical business object index stores historically relevant business object node attributes separately from the non-historically relevant business object node attributes;

update the retrieved previous historical version of the at least one historically relevant business object node attribute in response to the monitored modification; and store the new historical version of the at least one historically relevant business object node attribute and the updated previous historical version of the at least one historically relevant business object node attribute in the historical business object index.

2. The computer readable medium of claim 1, wherein monitoring at least one business object for a modification to the at least one business object node attribute includes:

identifying whether the at least one business object node attribute has been previously defined as historically relevant; and ignoring the monitored modification if the monitored modification is associated with a business object node attribute that is not previously defined as historically relevant.

3. The computer readable medium of claim 2, wherein identifying whether the at least one business object node has been previously defined as historically relevant includes comparing the modified business object node attribute to a historically relevant attribute list, where the historically relevant attribute list defines a set of historically relevant business object node attributes.

4. The computer readable medium of claim 1, wherein the historical business object index is stored in an in-memory database.

5. The computer readable medium of claim 4, wherein storing the new historical version of the at least one historically relevant business object node attribute and the updated previous historical version of the at least one historically relevant business object node attribute includes writing the new historical version of the at least one historically relevant business object node attribute and the updated previous historical version of the at least one historically relevant business object node attribute to the historical business object index.

6. The computer readable medium of claim 4, wherein each business object node is associated with an index in the in-memory database, and wherein information associated with historical versions of the particular historically relevant business object node attribute are stored within a corresponding index within the in-memory database.

7. The computer readable medium of claim 4, wherein only the historical business object index is stored in the in-memory database.

8. The computer readable medium of claim 7, wherein the non-historically historically relevant business object node attributes are not stored in another in-memory database.

9. The computer readable medium of claim 1, wherein each historical version of the historically relevant business object attribute includes a node ID, a parent node ID, a valid to date/time, a valid from date/time, and an attribute value.

10. The computer readable medium of claim 9, wherein updating the retrieved previous historical version of the at least one business object node attribute in response to the monitored modification includes changing the valid to date/time of the previous historical version of the at least one business object node attribute to the date/time of the monitored modification.

11. The computer readable medium of claim 10, wherein the valid from date/time of the new historical version of the at least one business object node attribute is the date/time of the monitored modification.

12. A computer-implemented method for analyzing historic changes to business objects, the method comprising:
monitoring at least one business object for a modification made to at least one business object node attribute, wherein a subset of business object node attributes of the at least one business object are defined as historically relevant;
preparing, in response to a monitored modification associated with particular historically relevant business object node attribute, a new historical version of the at least one historically relevant business object node attribute, the new historical version of the at least one historically relevant business object node attribute including the modified historically relevant business object node attribute value;
retrieving a previous historical version of the at least one historically relevant business object node attribute from a historical business object index, where the historical business object index stores historically relevant business object node attributes separately from the non-historically relevant business object node attributes;
updating the retrieved previous historical version of the at least one historically relevant business object node attribute in response to the monitored modification; and
storing the new historical version of the at least one historically relevant business object node attribute and the updated previous historical version of the at least one historically relevant business object node attribute in the historical business object index.

13. The method of claim 12, wherein monitoring at least one business object for a modification to the relevant business object node attribute includes:
identifying whether the at least one business object node attribute has been previously defined as historically relevant; and
ignoring the monitored modification if the monitored modification is associated with a business object node attribute that is not previously defined as historically relevant.

14. The method of claim 12, wherein the historical versions of the historically relevant business object node attributes are stored in an in-memory database.

15. The method of claim 14, wherein storing the new historical version of the at least one historically relevant business object node attribute and the updated previous historical version of the at least one historically relevant business object node attribute includes writing the new historical version of the at least one historically relevant business object node attribute and the updated previous historical version of the at least one historically relevant business object node attribute to the in-memory database.

16. A system comprising:
one or more computers; and
a non-transitory computer-readable medium coupled to the one or more computers having instructions stored thereon which, when executed by the one or more computers, cause the one or more computers to perform operations comprising:
monitoring at least one business object for a modification made to at least one business object node attribute, wherein a subset of business object node attributes of the at least one business object are defined as historically relevant;
preparing, in response to a monitored modification associated with particular historically relevant business object node attributes, a new historical version of the at least one historically relevant business object node attribute, the new historical version of the at least one historically relevant business object node attribute including the modified historically relevant business object node attribute value;
retrieving a previous historical version of the at least one historically relevant business object node attribute from a historical business object index, where the historical business object index stores historically relevant business object node attributes separately from the non-historically relevant business object node attributes;
updating the retrieved previous historical version of the at least one historically relevant business object node attribute in response to the monitored modification; and
storing the new historical version of the at least one historically relevant business object node attribute and the updated previous historical version of the at least one historically relevant business object node attribute in the historical business object index.

17. The system of claim 16, wherein monitoring at least one business object for a modification to the business object node attribute includes:
identifying whether the at least one business object node attribute has been previously defined as historically relevant; and
ignoring the monitored modification if the monitored modification is associated with a business object node attribute that is not previously defined as historically relevant.

* * * * *